(12) United States Patent
Keskar

(10) Patent No.: US 11,182,410 B2
(45) Date of Patent: *Nov. 23, 2021

(54) SYSTEMS AND METHODS FOR DETERMINING CONTEXTUALLY-RELEVANT KEYWORDS

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 212 days.

This patent is subject to a terminal disclaimer.

(21) Appl. No.: 16/145,766

(22) Filed: Sep. 28, 2018

(65) Prior Publication Data

US 2019/0332717 A1 Oct. 31, 2019

Related U.S. Application Data

(60) Provisional application No. 62/664,415, filed on Apr. 30, 2018.

(51) Int. Cl.
*G06F 7/00* (2006.01)
*G06F 16/31* (2019.01)
(Continued)

(52) U.S. Cl.
CPC .......... *G06F 16/313* (2019.01); *G06F 16/334* (2019.01); *G06F 21/6209* (2013.01); *G06F 40/247* (2020.01); *G06N 20/00* (2019.01)

(58) Field of Classification Search
CPC ............. G06F 16/374; G06F 16/24578; G06F 16/9535; G06F 16/313
See application file for complete search history.

(56) References Cited

U.S. PATENT DOCUMENTS 6,460,034 B1 * 10/2002 Wical .................... G06F 16/334
6,675,159 B1 * 1/2004 Lin ........................ G06F 40/253
(Continued)

FOREIGN PATENT DOCUMENTS

EP 3416066 A1 * 12/2018

OTHER PUBLICATIONS

GB 2572542, Agarwal et al., Oct. 9, 2019.*
(Continued)

*Primary Examiner* — Daniel A Kuddus
(74) *Attorney, Agent, or Firm* — Ziegler IP Law Group, LLC

(57) ABSTRACT

Disclosed is a system for determining contextually-relevant keywords related to text of an electronic document. The system comprises a memory, a database arrangement comprising an ontology and a synonym databank, a data processing arrangement and a sever arrangement. The data processing arrangement is operable to fetch the electronic document stored within the memory. Furthermore, the data processing arrangement determines the common words from the ontology and the synonyms corresponding to the common words from synonym databank. Moreover, the data processing arrangement determines the generated set of keywords comprising the common words and the synonyms. The server arrangement determines a preference score and an importance score for each keyword of the generated set of keywords. Furthermore, the server arrangement determines the cumulative rank of each keyword based on the preference score and the importance score, therefore determining contextually-relevant keywords.

13 Claims, 2 Drawing Sheets

(51) Int. Cl.
*G06F 21/62* (2013.01)
*G06N 20/00* (2019.01)
*G06F 16/33* (2019.01)
*G06F 40/247* (2020.01)

(56) References Cited

U.S. PATENT DOCUMENTS

| | | | | |
|---|---|---|---|---|
| 8,856,096 | B2* | 10/2014 | Marchisio | G06F 16/36 |
| | | | | 707/706 |
| 9,378,285 | B2* | 6/2016 | Marchisio | G06F 16/3344 |
| 9,747,390 | B2* | 8/2017 | Cooper | G06F 40/242 |
| 2003/0177112 | A1* | 9/2003 | Gardner | G06K 9/6272 |
| 2005/0267871 | A1* | 12/2005 | Marchisio | G06F 16/3338 |
| 2006/0235843 | A1* | 10/2006 | Musgrove | G06F 16/3344 |
| 2007/0011154 | A1* | 1/2007 | Musgrove | G06F 40/30 |
| 2014/0074826 | A1* | 3/2014 | Cooper | G06F 16/3338 |
| | | | | 707/722 |
| 2014/0074926 | A1* | 3/2014 | Bosworth | G06Q 50/01 |
| | | | | 709/204 |
| 2015/0310104 | A1* | 10/2015 | Marchisio | G06F 16/36 |
| | | | | 707/722 |
| 2016/0196340 | A1* | 7/2016 | Cheslow | G06F 16/243 |
| | | | | 707/728 |

OTHER PUBLICATIONS

WO02027538 A2, Turcato et al., Apr. 4, 2002.*
Context based Indexing in Search Engines using Ontology; Gupta et al.; 2010.*

* cited by examiner

SYSTEMS AND METHODS FOR DETERMINING CONTEXTUALLY-RELEVANT KEYWORDS

CROSS-REFERENCE TO RELATED APPLICATIONS

This is a non-provisional patent application based upon a U.S. provisional patent application No. 62/664,415 as filed on Apr. 30, 2018, and claims priority under 35 U.S.C. 199(e).

TECHNICAL FIELD

The present disclosure relates generally to data processing; and more specifically, to systems and methods for determining contextually-relevant keywords. Furthermore, the present disclosure relates to software products recorded on machine-readable non-transient data storage media, wherein the software products are executable upon computing hardware to implement the aforesaid methods of determining contextually-relevant keywords.

BACKGROUND

The internet comprises a large amount of information in a form of electronic documents, images, presentations and so forth. Such information is frequently exchanged between users. Furthermore, with an increase in a rate of exchange of such information between users, there exists a need for exchanging only selective information. For instance, prior to sharing a research document as a whole, a researcher associated with the research document will share a crux of the research document in a form of abstract, summary, keywords, metadata, literature review and so forth, that provides selective information about the research document to a prospective buyer (or a licensee). It will be appreciated that providing such selective information about the research document to the prospective buyer ensures that significant findings published within the research document is not revealed to the prospective buyer prior to purchase of the research document by the prospective buyer, while also guaranteeing that relevant information required by the prospective buyer to make a decision to purchase the research document is provided thereto. For example, a researcher associated with a research document may generate or extract one or more significant keywords associated with text of the research document. In such an example, the keywords for the research document will serve as points for information published within the research document without revealing significant findings therein, thereby enabling the research document to reach targeted users efficiently.

However, despite the keywords being an important facet between electronic documents and accessibility thereof to users, most electronic documents do not have keywords assigned thereto. On the other hand, if a particular electronic document does have keywords assigned thereto, conventionally, the keywords are assigned by an author of the electronic document based completely on a judgment thereof. It will be appreciated that such a conventional approach of assignment of the keywords to electronic documents is associated with various problems. Firstly, the keywords selected by the author may not be highly relevant to a text of the particular electronic document. Another problem associated with the conventional approach is that technical knowledge and/or technical vocabulary of the author of the electronic document may have a limited capacity, thereby, limiting a quality of the keywords that are selected by the author for the electronic document. Moreover, the author of the particular electronic document may be unaware of popular keywords that are used by end-users to search for content associated with the electronic document, thus, limiting accessibility (or visibility) of the electronic document to the end-users. In such an instance, determination and subsequent assignment of such popular keywords by the author will be a time consuming and tedious process for the author.

Therefore, in light of the foregoing discussion, there exists a need to overcome the aforementioned problems associated with the conventional techniques of determination and/or assignment of relevant keywords for electronic documents.

SUMMARY

The present disclosure seeks to provide a system of determining contextually-relevant keywords related to text of an electronic document. The present disclosure also seeks to provide a method of determining contextually-relevant keywords related to text of an electronic document. Furthermore, the present disclosure seeks to provide a software product recorded on machine-readable non-transient data storage media, wherein the software product is executable upon computing hardware to implement the aforesaid method of determining contextually-relevant keywords related to text of an electronic document.

The present disclosure seeks to provide a solution to the existing problems associated with determination of keywords that are contextually relevant to electronic documents. An aim of the present disclosure is to provide a solution that overcomes at least partially the problems encountered in prior art, and provide the system and method for determination of contextually-relevant keywords for electronic documents, thereby enabling to enhance an accessibility (or visibility) of the electronic documents to end-users while safeguarding critical information published within the electronic documents, as well as reducing time and effort required to be exerted by authors of the electronic documents in determining such contextually-relevant keywords.

In one aspect, an embodiment of the present disclosure provides a system for determining contextually-relevant keywords related to text of an electronic document, the system comprising:
a memory operable to store the electronic document therein;
a database arrangement comprising an ontology and a synonym databank;
a data processing arrangement communicatively coupled to the memory and the database arrangement, wherein the data processing arrangement is operable to
  fetch the electronic document stored within the memory,
  extract the text of the electronic document,
  receive a plurality of words from the ontology,
  compare each of the plurality of words with the text of the electronic document, to identify common words from the ontology that appear within the electronic document,
  receive from the synonym databank, a plurality of synonymous words corresponding to the common words, and
  generate a set of keywords comprising the common words and the plurality of synonymous words corresponding to the common words; and a server arrangement communicatively coupled to the database arrangement and the data processing arrangement, wherein the server arrangement is operable to
receive the set of keywords from the data processing arrangement,
determine a preference score for each keyword of the set of keywords, wherein the preference score is based on one or more preference parameters,
identify a semantic relationship of each keyword with other keywords of the set of keywords,
determine an importance score of each keyword of the set of keywords, based on the semantic relationship,
determine a cumulative rank for each keyword of the set of keywords, based on the preference score and the importance score of the keyword, and
determine, based on the cumulative rank of each keyword of the set of keywords, the contextually-relevant keywords related to the text of electronic document.

In another aspect, an embodiment of the present disclosure provides a method for determining contextually-relevant keywords related to text of an electronic document, wherein the method comprises:
extracting the text of the electronic document;
receiving a plurality of words from an ontology;
comparing each of the plurality of words with the text of the electronic document, to identify common words from the ontology that appear within the electronic document;
receiving a plurality of synonymous words corresponding to the common words;
generating a set of keywords comprising the common words and the plurality of synonymous words corresponding to the common words;
determining a preference score for each keyword of the set of keywords, wherein the preference score is based on one or more preference parameters;
identifying a semantic relationship of each keyword with other keywords of the set of keywords;
determining an importance score of each keyword of the set of keywords, based on the semantic relationship;
determining a cumulative rank for each keyword of the set of keywords, based on the preference score and the importance score of the keyword; and
determining, based on the cumulative rank of each keyword of the set of keywords, the contextually-relevant keywords related to the text of electronic document.

In yet another aspect, an embodiment of the present disclosure provides a software product recorded on machine-readable non-transient data storage media, characterized in that the software product is executable upon computing hardware to implement the aforementioned method for determining contextually-relevant keywords related to text of an electronic document.

Embodiments of the present disclosure substantially eliminate or at least partially address the aforementioned problems in the prior art, and enables selection of contextually-relevant keywords for electronic documents, thereby, reducing time and effort required for such selection of the contextually-relevant keywords by authors of the electronic documents. Furthermore, such contextually-relevant keywords enhance accessibility (or visibility) of the electronic documents for target audiences.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
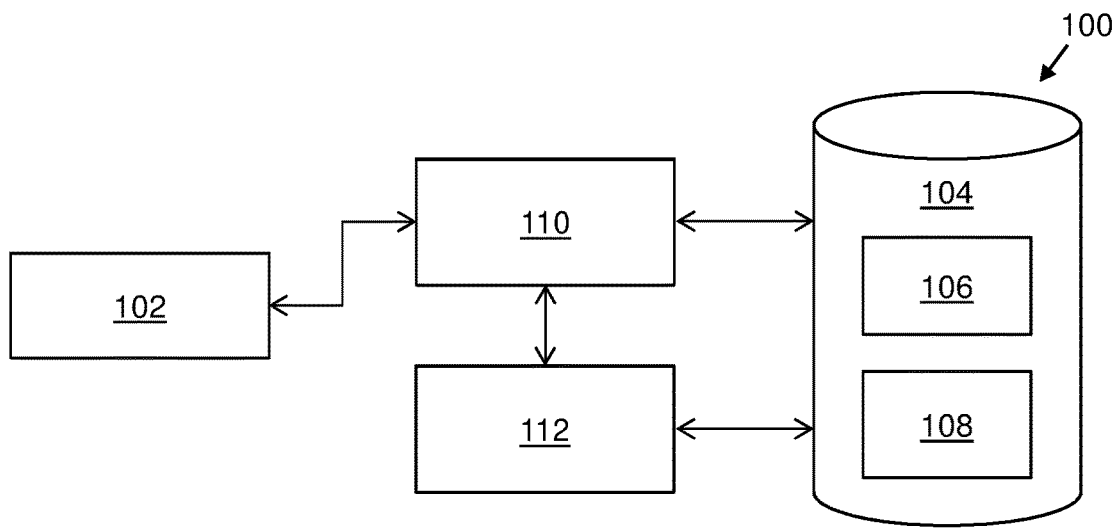
FIG. 1 is a schematic illustration of a system for determining contextually-relevant keywords, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for determining contextually-relevant keywords related to text of an electronic document, the system comprising:
a memory operable to store the electronic document therein;
a database arrangement comprising an ontology and a synonym databank;
a data processing arrangement communicatively coupled to the memory and the database arrangement, wherein the data processing arrangement is operable to
fetch the electronic document stored within the memory,
extract the text of the electronic document,
receive a plurality of words from the ontology,
compare each of the plurality of words with the text of the electronic document, to identify common words from the ontology that appear within the electronic document,
receive from the synonym databank, a plurality of synonymous words corresponding to the common words, and
generate a set of keywords comprising the common words and the plurality of synonymous words corresponding to the common words; and a server arrangement communicatively coupled to the database arrangement and the data processing arrangement, wherein the server arrangement is operable to receive the set of keywords from the data processing arrangement, determine a preference score for each keyword of the set of keywords, wherein the preference score is based on one or more preference parameters, identify a semantic relationship of each keyword with other keywords of the set of keywords, determine an importance score of each keyword of the set of keywords, based on the semantic relationship, determine a cumulative rank for each keyword of the set of keywords, based on the preference score and the importance score of the keyword, and determine, based on the cumulative rank of each keyword of the set of keywords, the contextually-relevant keywords related to the text of electronic document.

In another aspect, an embodiment of the present disclosure provides a method for determining contextually-relevant keywords related to text of an electronic document, wherein the method comprises:

extracting the text of the electronic document;

receiving a plurality of words from an ontology;

comparing each of the plurality of words with the text of the electronic document, to identify common words from the ontology that appear within the electronic document;

receiving a plurality of synonymous words corresponding to the common words;

generating a set of keywords comprising the common words and the plurality of synonymous words corresponding to the common words;

determining a preference score for each keyword of the set of keywords, wherein the preference score is based on one or more preference parameters;

identifying a semantic relationship of each keyword with other keywords of the set of keywords;

determining an importance score of each keyword of the set of keywords, based on the semantic relationship;

determining a cumulative rank for each keyword of the set of keywords, based on the preference score and the importance score of the keyword; and determining, based on the cumulative rank of each keyword of the set of keywords, the contextually-relevant keywords related to the text of electronic document.

In yet another aspect, an embodiment of the present disclosure provides a software product recorded on machine-readable non-transient data storage media, characterized in that the software product is executable upon computing hardware to implement the aforementioned method for determining contextually-relevant keywords related to text of an electronic document.

The present disclosure provides the system and method for determination of contextually-relevant keywords for electronic documents. The electronic documents, such as research documents, are meant to reach a target audience, such as a plurality of users that want to access the research documents. However, prior to obtaining legitimate access to the electronic documents, significant findings therein are required to be concealed from such plurality of users. The system and method allow determination of the contextually-relevant keywords for the electronic documents that improves the accessibility of the electronic document for the targeted audience. Moreover, the determination of such contextually-relevant keywords enables a time efficient process for the author of the electronic document. Furthermore, such a system and method reduce the laborious effort required for the selection of keywords by the author of the electronic document.

The system comprises a memory operable to store the electronic document therein. The electronic document is stored within the memory, wherein the memory can be implemented as a solid-state drive memory, a hard disk drive memory, double data rate random access memory and so forth.

In an embodiment, the electronic document is stored within the memory in an encrypted format. The encryption of the electronic document enables to store the electronic document securely within the memory. In an example, the electronic document is a research document. Furthermore, an author of the research document would prefer to store the research document within a personal computing device thereof, as the author would not want a content of the research document to be revealed to a third-party without his consent. In such an example, the research document will be stored in a memory of the personal computing device of the author in the encrypted format, so that the third-party cannot access the content of the research document without obtaining the consent from the author.

The system comprises a database arrangement comprising an ontology and a synonym databank. The term "database arrangement" as used throughout the present disclosure, relates to programmable and/or non-programmable components that allow storage of data therein, such as, data in a form of text, numbers, text fields, numerical fields, selections, tables, columns and so forth. The term "ontology" as used throughout the present disclosure, relates to a collection of data in a form of text comprising words, key-phrases, concepts and so forth. For example, the ontology corresponds to "life sciences" and the data is associated with the ontology relates to cell division, cell mutation, blood cancer and so forth. The term "synonym databank" as used throughout the present disclosure, relates to a collection of synonymous words corresponding to the words of the ontology. It will be appreciated that the collection of data in the ontology and will be interlinked with the collection of synonymous words within the synonym databank. For example, the ontology comprises a word "cancer". In such an example, the synonym databank will have the synonymous words corresponding to the word "cancer" such as "tumour", "malignance", "carcinoma" and so forth stored therein.

In an embodiment, the ontology is a hierarchical ontology comprising a plurality of nodes, and wherein each of the plurality of nodes is associated with a plurality of words related to a specific subject-matter. The hierarchical ontology comprises the plurality of nodes, wherein each node of the plurality of nodes can be further linked to one or more nodes. Furthermore, each node of the plurality of nodes is associated with a plurality of specific words of the ontology. Furthermore, such a plurality of specific words relate to a specific subject-matter, such as a subset of the subject-matter that the ontology corresponds thereto. In an example, the ontology relates to "life-sciences" and comprises three nodes related to subject-matters of "diseases", "causes of the diseases" and "drugs". Furthermore, the node "diseases" is further linked to nodes "Typhoid", "Malaria", "Dengue" and so forth. Moreover, the node "diseases" is associated to a plurality of specific words such as "communicable diseases", "infections", "fever" and so forth. The node "causes of the diseases" is further linked to nodes "Bacteria", "Virus", "Protozoa", "Fungi" and so forth. The node "drugs" is further linked to nodes "Chloroquine", "Mefloquine", "Advil", "Tylenol" and so forth.

Furthermore, the system comprises a data processing arrangement communicatively coupled to the memory and the database arrangement, wherein the data processing arrangement is operable to fetch the electronic document stored within the memory. The data processing arrangement is communicatively coupled to the memory and the database arrangement, such as, via a communication network. In an example, the communication network includes, but is not limited to, a short range radio communication network (for example, Bluetooth®, Bluetooth Low Energy (BLE), Infrared, ZigBee® and so forth), Local Area Networks (LANs), Wide Area Networks (WANs), Metropolitan Area Networks (MANs), Wireless LANs (WLANs), Wireless WANs (WWANs), Wireless MANs (WMANs), the Internet, cellular networks (for example, second generation (2G), third generation (3G), fourth generation (4G), fifth generation (5G) or sixth generation (6G) telecommunication networks), Worldwide Interoperability for Microwave Access (WiMAX) networks or any combination thereof. Moreover, the data processing arrangement fetches the electronic document from the memory. The electronic document stored in the memory can be in a form of a word-processor document format (such as .doc, .docx and so forth), image format (such as .png, .jpg, .jpeg and so forth), presentation file-format (such as .ppt, .pptx, .pot and so forth), portable document format (such as .pdf and so forth), spreadsheet file format (such as .xlx, .xls and so forth), and the like. Furthermore, the data processing arrangement is operable to extract the text of the electronic document. The data processing arrangement fetches the electronic document from the memory and subsequently, extracts the text within the electronic document. It will be appreciated that the electronic document can comprise textual data, pictorial representation of data, mathematical equations and so forth. In such an instance, the data processing arrangement extracts the textual data (referred to as "text" throughout the present disclosure) from the electronic document. Optionally, the data processing arrangement extracts the text of the electronic document in JavaScript Object Notation (.json) file format. In an example, a set of experimental data recorded within a research document in a word-processor document (such as .doc) is stored in a memory of a computing device of a researcher associated with the research document. The research document comprises textual data, graphs, schematic diagrams, block diagrams and chemical equations. In such an example, the data processing arrangement fetches the research document stored in the word-processor document format, from the memory of the computing device of the researcher. Subsequently, the data processing arrangement extracts the textual data from the research document in JavaScript Object Notation (.json) file format.

Furthermore, the data processing arrangement is operable to receive a plurality of words from the ontology. As mentioned hereinbefore, the ontology comprises a plurality of nodes corresponding to the specific subject-matter, wherein each of the plurality of nodes is associated with a plurality of words. The data processing arrangement is operable to receive all such plurality of words corresponding to each of the plurality of nodes associated with the ontology. Optionally, the plurality of words is received in succession by the data processing arrangement, such as, based on a node that a word of the plurality of words corresponds thereto. Alternatively, the data processing arrangement is operable to receive all words at a same time.

In an embodiment, the data processing arrangement is further operable to receive an input from a user associated with the electronic document, wherein the received input corresponds to a subject-matter associated with the text of the electronic document. The user associated with the electronic document can provide an input corresponding to the subject-matter (such as a technical field) of the electronic document. The data processing arrangement will receive the input provided by the user. In an example, the user is a researcher who has performed experiments related to a subject-matter of lung cancer. The researcher will provide the input corresponding to the subject-matter as "lung cancer" and the data processing arrangement will receive such an input provided by the researcher.

Furthermore, the data processing arrangement is operable to compare the subject-matter corresponding to the received input with the subject-matter corresponding to the plurality of nodes. The input received from the user is compared with the plurality of nodes of the ontology by the data processing arrangement, wherein each node of the plurality of nodes relates to the specific subject-matter. Furthermore, the data processing arrangement is operable to identify, based on the comparison, the node of the plurality of nodes related to the subject-matter corresponding to the received input. The data processing arrangement identifies the node of the plurality of nodes of the ontology that is identical to the received input from the user. Furthermore, the data processing arrangement is operable to receive the plurality of words associated with the identified node of the plurality of nodes. The identified plurality of words corresponding to the node identical to the received input from the user, is received by the data processing arrangement. In an example, the input received from the user is "lung cancer" and the received input is compared with the plurality of nodes of the ontology. The node corresponding to "Lung cancer" is identified by the data processing arrangement. It will be appreciated that the received input "Lung cancer" is identical to the subject-matter of the identified node corresponding to the "Lung cancer". Consequently, plurality of words associated with the identified node of "Lung cancer" is received by the data processing arrangement.

The data processing arrangement is operable to compare each of the plurality of words with the text of the electronic document, to identify common words from the ontology that appear within the electronic document. The plurality of words received from the ontology is compared with the text extracted from the electronic document. Moreover, common words that appear in the ontology and the text of the electronic document are identified. In an example, a research document comprises words "the", "top", "drugs", "for" and "cancer". It will be appreciated that the ontology may only comprise words related to a specific subject-matter and therefore, words such as "the", "top", "for" and so forth may not be present therein. The data processing arrangement will fetch words from the ontology, compare the words with the extracted text of the research document and identify the common words as "drugs" and "cancer". Optionally, an n-gram model is used for the comparison of the plurality of words received from the ontology and the text extracted from the electronic document. It will be appreciated that the n-gram model relates to a contiguous sequence of 'n' items from a given plurality of words (such as a sentence), wherein 'n' represents a number of words within each sentence. Furthermore, a sentence having one word is referred as unigram or one-gram, a sentence having two words are referred as bigram or two-gram, a sentence having three words are referred as trigram or three-gram and so forth. In an example, the plurality of words associated with the text extracted from the electronic document may be "top drugs for cancer", "top drugs for", "drugs for cancer", "top drugs", "drugs for", "for cancer", "top", "drugs", "for" and "cancer". In such an example, the plurality of words "top drugs for cancer" is a four-gram. Similarly, the plurality of words "top drugs for", and "drugs for cancer" are trigrams or three-grams, the plurality of words "top drugs", "drugs for", and "for cancer" are bigrams or two-gram and the plurality of words "top", "drugs", "for" and "cancer" are unigrams or one-grams.

Furthermore, the data processing arrangement is operable to receive from the synonym databank, a plurality of synonymous words corresponding to the common words. The common words identified from the ontology and the text extracted from electronic document, are looked up in the synonym databank by the data processing arrangement. Moreover, the synonymous words corresponding to the identified common words are received by the data processing arrangement from the synonym databank. In an example, a plurality of words of the ontology is compared with a research document and common words are identified to be "cancer", "blood", "skin" and so forth. The synonymous words corresponding to the word "cancer", identified as "tumour", "malignance", "carcinoma" and so forth, are received from the synonym databank. Moreover, the synonymous words corresponding to the word "blood", identified as "plasma", "body fluid" and so forth, are received from the synonym databank. Moreover, the synonymous words corresponding to the word "skin", identified as "membrane", "epidermis", "dermis" and so forth, are received from the synonym databank.

In an embodiment, the data processing arrangement is operable to identify the common words and receive the plurality of synonymous words corresponding to the common words in a sequential manner. The data processing arrangement identifies the common words between the plurality of words received from the ontology and the text extracted from the electronic document. Subsequently, the data processing arrangement receives the synonymous words from the synonym databank corresponding to the common words of the ontology. In an example, the data processing arrangement identifies the common words as "skin", "tumour" and "disease". Subsequently, the data processing arrangement looks up for synonyms of the words "skin", "tumour" and "disease" from the synonym databank. Consequently, the data processing arrangement receives the synonyms of the word "skin" as "membrane", "epidermis" and "dermis", the synonyms of the word "tumour" as "malignance", "carcinoma" and "cancer" and the synonyms of the word "disease" as "illness", "sickness" and "ill health" from the synonym databank. In another embodiment, the data processing arrangement is operable to identify the common words and receive the plurality of synonymous words corresponding to the common words in a simultaneous manner. The data processing arrangement identifies a common word between plurality of words received from the ontology and the text extracted from the electronic document. Simultaneously, the data processing arrangement receives the synonyms of the common word from the synonym databank. Subsequently, the data processing arrangement identifies a next common word between the plurality of words received from ontology and the extracted text. Thereafter, the data processing arrangement receives the synonyms of the next common word from the synonym databank. In an example, the data processing arrangement identifies a common word from a research document as "skin". Simultaneously, the data processing arrangement looks up for synonyms of the word "skin" in the synonym databank and receives the synonyms corresponding to the word "skin" as "membrane", "epidermis" and "dermis". Subsequently, the data processing arrangement identifies a next common word from the research document as "tumour". Simultaneously, the data processing arrangement looks up for synonyms of the word "tumour" in the synonym databank and receives the synonyms corresponding to the word "tumour" as "malignance", "carcinoma" and "cancer".

Furthermore, the data processing arrangement is operable to generate a set of keywords comprising the common words and the plurality of synonymous words corresponding to the common words. The data processing arrangement combines the common words identified using the ontology and the synonymous words corresponding to the received common words (received from the synonym databank) and generates the set comprising the combination of the words. In an example, the common words identified between a research document and an ontology are "skin", "tumour" and "disease". The corresponding synonyms of the word "skin" are "membrane", "epidermis" and "dermis", the corresponding synonyms of the word "tumour" are "malignance", "carcinoma" and "cancer" and the corresponding synonyms of the word "disease" are "illness", "sickness" and "ill health". The data processing arrangement will therefore, generate the set of keywords comprising the words "skin", "tumour", "disease", "membrane", "epidermis", "dermis", "malignance", "carcinoma", "cancer", "illness", "sickness" and "ill health", wherein the generated set of keywords does not comprise the keywords in any particular order.

Furthermore, the system comprises a server arrangement communicatively coupled to the data processing arrangement and the database arrangement, wherein the server arrangement is operable to receive the generated set of keywords from the data processing arrangement. The term "server arrangement" as used throughout the present disclosure, relates to an arrangement of programmable and/or non-programmable components. The server arrangement can be implemented in a centralized architecture, a decentralized architecture or a distributed architecture of the programmable and/or non-programmable components. In an example, the server arrangement is implemented using cloud servers. The set of keywords generated by the data processing arrangement is received by the server arrangement, wherein the server arrangement is communicatively coupled to the data processing arrangement via a communication network (as mentioned hereinbefore).

Furthermore, the server arrangement is operable to determine a preference score for each keyword of the generated set of keywords, wherein the preference score is based on one or more preference parameters. As mentioned hereinabove, the generated set of keywords does not comprise the keywords in any particular order. In such an instance, the server arrangement assigns the preference score to each keyword of the generated set of keywords to determine an order (such as an order of relevance) of each keyword within the generated set of keywords. The preference score of the generated set of keywords is determined by the server arrangement based on the one or more preference parameters.

In an embodiment, the one or more preference parameters comprise: frequency of occurrence of each keyword of the set of keywords within search strings previously used by a plurality of users of a search engine, frequency of occurrence of the common words within the text of the electronic document, location of occurrence of the common words within the text of the electronic document and publicly-available information corresponding to each keyword of the generated set of keywords of the electronic document. The preference score of a keyword depends on the frequency of occurrence of the keyword within search strings previously used by a plurality of users of a search engine used to search for information corresponding to the keyword. In such an instance, a keyword of the generated set of keywords that occurs more frequently in the search strings is given higher preference score as compared to a keyword of the generated set of keywords that occurs less frequently in the search strings. In an example, a research document comprises a word "carcinoma". The synonyms associated with the word "carcinoma" such as "cancer", "tumor" and so forth will be received from the synonym databank. It will be appreciated that the word "cancer" is a well-known term as compared to the word "carcinoma". Therefore, a plurality of users searching for the word "cancer" will be higher, as compared to a plurality of users searching for the word "carcinoma". Consequently, the frequency of occurrence of the word "cancer" is more than the frequency of occurrence of the word "carcinoma" within search strings. Therefore, the word "cancer" is given the higher preference score as compared to the preference score given to the word "carcinoma". Furthermore, the preference score depends on the frequency of occurrence of the common words within the text of the electronic document. In such an instance, a word that occurs more frequently within the text of the electronic document is given higher preference score as compared to word that occurs less frequently within the text of the electronic document. In an example, a research document comprises a word "leukaemia" that occurs ten times in the research document, a word "blood" that occurs eight times in the research document and a word "infection" that occurs four times in the research document. The frequency of occurrence of the word "leukaemia" is more than the frequency of occurrence of the word "blood" and the frequency of occurrence of the word "blood" is more than the word "infection". Therefore, the word "leukaemia" is assigned a higher preference score than the word "blood" and the word "blood" is assigned a higher preference score than the word "infection". Moreover, the preference score of the keywords depends on the location of occurrence thereof within the text of the electronic document. It will be appreciated that the electronic document can comprise various sections such as introduction, abstract, detailed explanation and so forth. Furthermore, each section of the electronic document will have a different significance as compared to the other sections of the electronic document. For example, the abstract can have a higher significance as compared to the introduction section. In such an instance, a keyword occurring at positions within sections having more significance will have the preference score more than a keyword occurring at positions within sections having less significance. In an example, keywords "leukaemia" and "blood" occur in the abstract section of a research document, whereas a word "infection" occurs within the introduction section of the research document. Furthermore, a relevance or significance of the abstract section of the research document is more than the introduction section of the research document. Therefore, the keywords "leukaemia" and "blood" are assigned a higher preference score as compared to the keyword "infection". Furthermore, the preference score of each keyword of the generated set of keywords of the electronic document depends on the publicly-available information corresponding to the keyword. In such an instance, a keyword that has more publicly-available information associated therewith (for example, the information corresponding to the keyword is well-known on internet) will be assigned higher preference score as compared to a keyword that does not have (or that has less) publicly-available information associated therewith. In an example, a generated set of keywords comprises the words "meningitis", "brain-fever", "symptoms" and so forth. It will be appreciated that the word "brain-fever" is a synonym of the word "meningitis". Moreover, the word "meningitis" is a more well-known word to the public as compared to the word "brain-fever" and therefore, the publicly-available information associated with the word "meningitis" will be more than the publicly-available information associated with the word "brain-fever". Therefore, the word "meningitis" will be given a higher preference score as compared to the word "brain-fever".

Furthermore, the server arrangement is operable to identify a semantic relationship of each keyword with other keywords of the generated set of keywords. The term "semantic relationship" as used throughout the present disclosure, relates to an association between one or more keywords of the generated set of keywords, wherein the association can be a technical association, a logical association, a scientific association and so forth. In an example, a keyword "drug" can be associated with a second keyword "disease" in several ways. In such an example, the "drug" can be known to be effective in treating the "disease", the "drug" can be known to be ineffective in treating the "disease", the "drug" can aggravate growth of the "disease" and so forth. Consequently, the associations between the "drug" and the "disease" such as "effective in treating", "ineffective in treating" or "aggravate growth" can be the semantic relationships between the two keywords. Optionally, parsing techniques can be implemented to identify the semantic relationships between keywords of the generated set of keywords. The term "parsing techniques" as used throughout the present disclosure, relates to an analysis performed by the server arrangement, wherein the server arrangement analyses the semantic relationship between the keywords and generates a result in a hierarchical structure (such as a hierarchical tree). It will be appreciated that the hierarchical structure determines the publicly-available semantic relationships present between the keywords of the generated set of keywords. Optionally, the parsing technique used to identify the semantic relationships between the generated set of keywords can be a frame semantic parsing technique. Furthermore, each keyword of the generated set of keywords can have one or more semantic relationships with each other and/or semantic relationships with one or more other keywords of the generated set of keywords.

In an embodiment, the server arrangement is operable to identify the semantic relationship of each keyword with other keywords of the generated set of keywords, based on at least one of: significance of the text of the electronic document and publicly-available information corresponding to each keyword of the generated set of keywords of the electronic document. The semantic relationship between the keywords can be identified by the significance of the text of the electronic document, wherein the significance of the text refers to importance of the information (such as, based on a public-necessity for the information) provided within the text of the electronic document. Optionally, such a significance of the text can be provided as an input by the author of the electronic document. In an example, a research document establishes a relationship between flu and the symptoms associated with the flu. Furthermore, the author concludes in the research document that the symptoms associated with the flu are body pain, nasal congestion, cough and so forth. However, such information that concludes that the symptoms associated with the flu are body pain, nasal congestion, cough and so forth, is widely publicly-available and is easily accessible to anyone. Thus, the author provides the input for the significance of the electronic document as low. In such an example, the semantic relationship between the keywords "flu" and the "symptoms" associated with the flu will be identified based on the significance of the text of the electronic document. Alternatively, a research document establishes a relationship between flu and previously-unknown genetic factors that can result in faster recovery from the flu. In such an example, the significance of the text of the research document will be high and the semantic relationship between the keyword "flu" and the genetic factors will be identified based on the significance of the text of the electronic document. Furthermore, the semantic relationship between the keywords can be identified using the publicly-available information corresponding to each keyword of the generated set of keywords of the electronic document. The publicly-available association (such as the technical association, the logical association and so forth) of the two or more keywords will be identified by the server arrangement. In an example, a research document is associated with a "treatment" of "Typhoid". The research document comprises keywords such as "Typhoid", "ceftriaxone", "ciprofloxacin", "Tylenol" and so forth. It will be appreciated that the publicly-available information about drugs "ceftriaxone" and "ciprofloxacin" concludes that the drugs "ceftriaxone" and "ciprofloxacin" are effective in treating Typhoid, whereas the drug "Tylenol" is ineffective in treating Typhoid. Therefore, the semantic relationship between the words "ceftriaxone", "ciprofloxacin" and "Typhoid" will be identified as "effective in treatment" and between the words "Tylenol" and "Typhoid" will be identified as "ineffective in treatment".

Furthermore, the server arrangement is operable to determine an importance score of each keyword of the generated set of keywords, based on the semantic relationship. The server arrangement is operable to determine the importance score of each keyword, based on the sematic relationships identified between the keyword and other keywords of the generated set of keywords. In an example, when the significance of the electronic document is low and the semantic relationship is determined between keywords "flu" and "symptoms" within the electronic document, a low importance score is determined for each of "flu" and "symptoms" based on the low significance of the electronic document. It will be appreciated that the server arrangement is operable to assign the preference score as well as the importance score to each keyword of the generated set of keywords.

Furthermore, the server arrangement is operable to determine a cumulative rank for each keyword of the generated set of keywords, based on the determined preference score and the determined importance score of the keyword. As mentioned hereinabove, the server arrangement is operable to determine the preference score and the importance score for each keyword of the generated set of keywords. Subsequently, the server arrangement is operable to determine the cumulative rank for each keyword using the preference score and the importance score thereof. The server arrangement is operable to rank each keyword of the generated set of keywords based on the cumulative ranking assigned to the keyword. It will be appreciated that the preference score is determined for an individual keyword, whereas the importance score is determined for two or more keywords. In an example, a keyword "cough" appears nine times in a research document. Moreover, a keyword "flu" appears five times in a research document. The preference score associated with the word "cough" based on the frequency of occurrence in the research document will be more than the preference score associated with the word "flu". Moreover, the semantic relationship between the words "cough" and "flu" is determined based on publically-available information that "cough" is a symptom of "flu". Furthermore, based on the semantic relationship determined between "cough" and "flu", a same importance score will be assigned to both the words "cough" and "flu". Thus, the cumulative ranking of the keywords will depend on the individual preference scores of the keywords, as well as the importance score associated with both the keywords.

Furthermore, the server arrangement is operable to determine, based on the cumulative rank of each keyword of the generated set of keywords, the contextually-relevant keywords related to the text of electronic document. The server arrangement is operable to assign the cumulative rank to each keyword of the generated set of keywords and thereafter the contextually-relevant keywords related to the text of electronic document are determined. The contextually-relevant keywords relate to the keywords that are ranked high as compared to other keywords of the generated set of keywords. Such contextually-relevant keywords correspond to the keywords that can arouse an interest in third-parties towards the text of the electronic document, without revealing significant content published with the electronic document to the third-parties. Optionally, the keywords that have the low cumulative rank are not accepted as the contextually-relevant keywords and can therefore be rejected. In an example, a generated set of keywords comprises 50 keywords. In such an example, the server arrangement generates 10 contextually-relevant keywords out of the generated set of keywords comprising 50 keywords. It will be appreciated that the 10 generated keywords will have high cumulative ranks and therefore, high contextual-relevance to the text of the electronic document as compared to the other keywords of the generated set of keywords.

In an embodiment, the server arrangement is further operable to: generate, based on the determined cumulative rank of each keyword of the generated set of keywords, a list comprising the determined contextually-relevant keywords arranged in at least one of: an increasing order, or a decreasing order of the cumulative ranks. The contextually-relevant keywords determined can be arranged in the increasing order, or the decreasing order of the cumulative ranks assigned thereto. In an example, the contextually-relevant keywords comprise the keywords "lung", "cancer", "blood" and "bones". Furthermore, the cumulative rank of the keyword "cancer" is highest, the cumulative ranking of the keyword "lung" is second highest, the cumulative rank of the keyword "blood" is third highest and the cumulative ranking of the keyword "bones" is lowest. Therefore, the list of the determined contextually-relevant keywords can be in an order: cancer, lung, blood and bones, such as, in the decreasing order of the cumulative ranks of the keywords. Furthermore, the list of the determined contextually-relevant keywords can be in the order: bones, blood, lung and cancer or in the increasing order of the cumulative ranks of the keywords. Furthermore, the server arrangement is further operable to recommend the list of the contextually-relevant keywords to the user associated with the electronic document. The server arrangement can recommend the list of the contextually-relevant keywords to the user of the electronic document, wherein the user can use the contextually-relevant keywords for several purposes. In an example, the user is an author of a research document and can use the recommended list of the contextually-relevant keywords for generating a summary corresponding to the research document. It will be appreciated that the usage of the recommended list of the contextually-relevant keywords in the summary will enable the research document to be more accessible on the internet, such as, when the summary associated with the research document is shared by the author on the internet (such as for providing an insight of text of the research document that can be purchased from the author). In another example, the recommended list of the contextually-relevant keywords can be used to input the contextually-relevant keywords in a keyword-field of the research document.

In an embodiment, the server arrangement is operable to implement a machine-learning algorithm for determining the contextually-relevant keywords related to the text of electronic document. Furthermore, the server arrangement uses the machine-learning algorithm for performing the abovementioned steps, such as determining the semantic relationships between the two or more keywords, determining the importance score between the two or more keywords based on the semantic relationships and so forth. Such a machine-learning algorithm is operable to employ any computationally intelligent technique and consequently, adapt to unknown or changing variables for better performance. For example, the machine-learning algorithm is operable to adapt weights assigned to the preference score and/or the importance score for determining the cumulative rank of each keyword of the generated set of keywords.

In an embodiment, the memory is implemented within a client device and the data processing arrangement is implemented in one of: the client device, or the server arrangement. The memory that stores the electronic document can be implemented in the client device (such as a personal computing device of a user), wherein the client device can be a laptop computer, a tablet computer, a smartphone, a personal digital assistant (PDA) and so forth. Furthermore, the data processing arrangement can be implemented on the client device or alternatively, on the server arrangement.

The present disclosure also relates to the method as described above. Various embodiments and variants disclosed above apply mutatis mutandis to the method.

The method of determining contextually-relevant keywords related to text of an electronic document, comprises extracting the text of the electronic document; receiving a plurality of words from an ontology; comparing each of the plurality of words with the text of the electronic document, to identify common words from the ontology that appear within the electronic document; receiving a plurality of synonymous words corresponding to the common words; generating a set of keywords comprising the common words and the plurality of synonymous words corresponding to the common words; determining a preference score for each keyword of the set of keywords, wherein the preference score is based on one or more preference parameters; identifying a semantic relationship of each keyword with other keywords of the set of keywords; determining an importance score of each keyword of the set of keywords, based on the semantic relationship; determining a cumulative rank for each keyword of the set of keywords, based on the preference score and the importance score of the keyword and determining, based on the cumulative rank of each keyword of the set of keywords, the contextually-relevant keywords related to the text of electronic document.

In an embodiment, the method further comprises storing the electronic document in an encrypted format.

In an embodiment, the ontology is a hierarchical ontology comprising a plurality of nodes, and wherein each of the plurality of nodes is associated with a plurality of words related to a specific subject-matter.

In an embodiment, the method further comprises:
receiving an input from a user associated with the electronic document, wherein the input corresponds to a subject-matter associated with the text of the electronic document;
comparing the subject-matter corresponding to the input with the subject-matter corresponding to the plurality of nodes;
identifying, based on the comparison, the node of the plurality of nodes related to the subject-matter corresponding to the input; and
receiving the plurality of words associated with the node of the plurality of nodes.

In an embodiment, the method comprises identifying the common words and receiving the plurality of synonymous words corresponding to the common words at in a:
sequential manner, or
simultaneous manner.

In an embodiment, the one or more preference parameters comprise: frequency of occurrence of each keyword of the set of keywords within search strings previously used by a plurality of users of a search engine, frequency of occurrence of the common words within the text of the electronic document, location of occurrence of the common words within the text of the electronic document and publicly-available information corresponding to each keyword of the generated set of keywords of the electronic document.

In an embodiment, the method comprises identifying the semantic relationship of each keyword with other keywords of the generated set of keywords, based on at least one of: significance of the text of the electronic document and publicly-available information corresponding to each keyword of the generated set of keywords of the electronic document.

In an embodiment, the method further comprises:
generating, based on the cumulative rank of each keyword of the set of keywords, a list comprising the contextually-relevant keywords arranged in at least one of: an increasing order, or a decreasing order of the cumulative ranks; and
recommending the list of the contextually-relevant keywords to the user associated with the electronic document.

DETAILED DESCRIPTION OF THE DRAWINGS

Referring to FIG. 1, there is shown a schematic illustration of a system 100 for determining contextually-relevant keywords related to text of an electronic document, in accordance with an embodiment of the present disclosure. The system 100 comprises a memory 102 that is operable to store the electronic document therein. The system 100 further comprises a database arrangement 104 comprising an ontology 106 and a synonym databank 108. Furthermore, the system 100 comprises a data processing arrangement 110 and a server arrangement 112. As shown, the data processing arrangement is 110 communicatively coupled to the memory 102 and the database arrangement 104. Furthermore, the server arrangement 112 is communicatively coupled to the database arrangement 104 and the data processing arrangement 110.

Figure 2A:
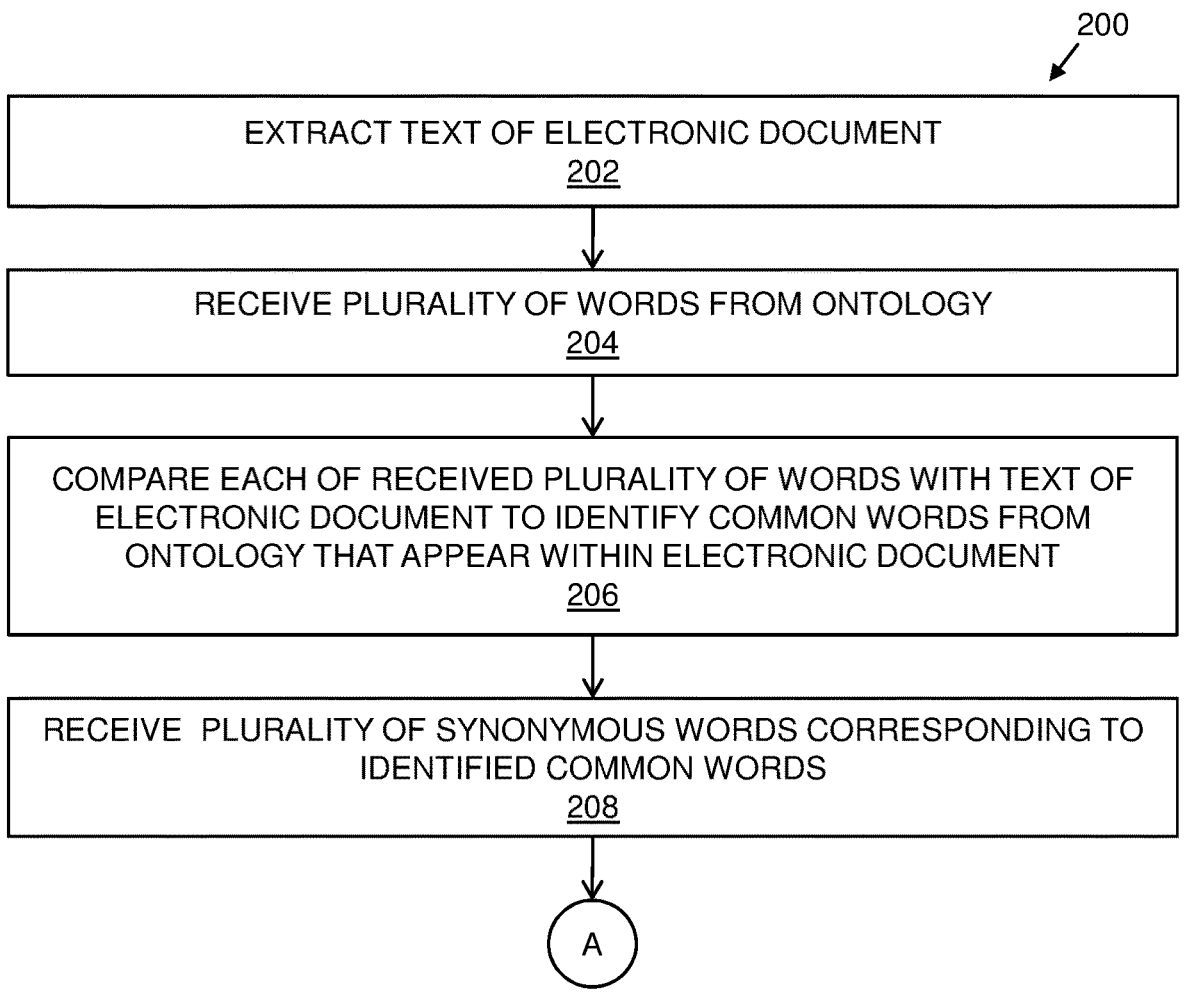
FIGS. 2A and 2B are illustrations of steps of a method for determining contextually-relevant keywords, in accordance with an embodiment of the present disclosure.
Figure 2B:
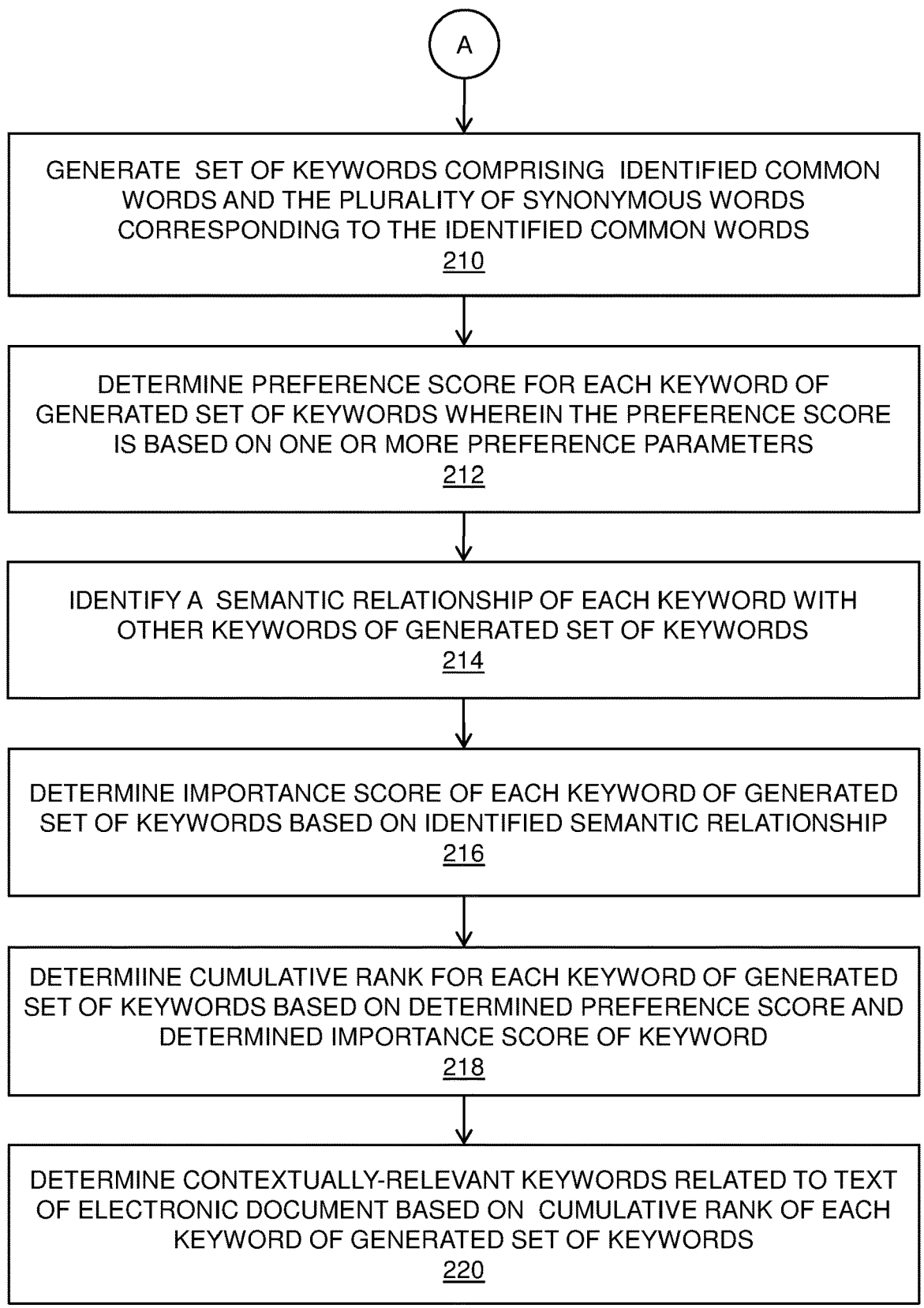

Referring to FIGS. 2A and 2B, there are shown steps of a method 200 for determining contextually-relevant keywords related to text of an electronic document, in accordance with an embodiment of the present disclosure. At a step 202, the text of the electronic document is extracted. At a step 204, a plurality of words is received from an ontology.

At a step 206, each of the received plurality of words is compared with the text of the electronic document, to identify common words from the ontology that appear within the electronic document. At a step 208, a plurality of synonymous words corresponding to the identified common words is received. At a step 210, a set of keywords comprising the identified common words and the plurality of synonymous words corresponding to the identified common words is generated. At a step 212, a preference score for each keyword of the generated set of keywords is determined wherein the preference score is based on one or more preference parameters. At a step 214, a semantic relationship of each keyword with other keywords of the generated set of keywords is identified. At a step 216, an importance score of each keyword of the generated set of keywords is determined based on the identified semantic relationship. At a step 218, a cumulative rank for each keyword of the generated set of keywords is determined based on the determined preference score and the determined importance score of the keyword. At a step 220, the contextually-relevant keywords related to the text of electronic document are determined based on the cumulative rank of each keyword of the generated set of keywords.

The steps 202 to 220 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for determining contextually-relevant keywords related to text of an electronic document, the system comprising:
   a memory configured to store the electronic document, wherein the electronic document is stored within the memory in an encrypted format;
   a database arrangement comprising an ontology and a synonym databank;
   a data processing arrangement communicatively coupled to the memory and the database arrangement, wherein the data processing arrangement is configured to
      fetch the electronic document stored within the memory,
      extract the text of the electronic document,
      receive a plurality of words from the ontology,
      compare each of the plurality of words with the text of the electronic document, to identify common words from the ontology that appear within the electronic document,
      receive from the synonym databank, a plurality of synonymous words corresponding to the common words, and
      generate a set of keywords comprising the common words and the plurality of synonymous words corresponding to the common words; and
   a server arrangement communicatively coupled to the database arrangement and the data processing arrangement, wherein the server arrangement is configured to
      receive the set of keywords from the data processing arrangement, determine a preference score for each keyword of the set of keywords, the preference score being a score of relevance for each keyword of the set of keywords, wherein the preference score is based on one or more preference parameters, and wherein the one or more preference parameters comprise: frequency of occurrence of each keyword of the set of keywords within search strings previously used by a plurality of users of a search engine, frequency of occurrence of the common words within the text of the electronic document, location of occurrence of the common words within the text of the electronic document and publicly-available information corresponding to each keyword of the generated set of keywords of the electronic document,
      identify a semantic relationship of each keyword with other keywords of the set of keywords,
      determine an importance score of each keyword of the set of keywords, the importance score being a score of significance of each keyword of the set of keywords, wherein the importance score is based on the semantic relationship between the keyword and other keywords of the generated set of keywords,
      determine a cumulative rank for each keyword of the set of keywords, based on the preference score and the importance score of the keyword,
      determine, based on the cumulative rank of each keyword of the set of keywords, the contextually-relevant keywords related to the text of electronic document, wherein the contextually-relevant keywords correspond to keywords of the set of keywords that arouse an interest in third-parties towards the text of the electronic document without revealing the text of the electronic document,
      generate, based on the cumulative rank of each keyword of the set of keywords, a list comprising the contextually-relevant keywords arranged in at least one of: an increasing order, or a decreasing order of the cumulative ranks; and
      generate the list of the contextually-relevant keywords for the user associated with the electronic document.

2. The system of claim 1, wherein the memory is implemented within a client device and wherein the data processing arrangement is implemented in one of: the client device, or the server arrangement.

3. The system of claim 1, wherein the ontology is a hierarchical ontology comprising a plurality of nodes, and wherein each of the plurality of nodes is associated with a plurality of words related to a subject-matter.

4. The system of claim 3, wherein the data processing arrangement is further configured to:
   receive an input from a user associated with the electronic document, wherein the received input corresponds to a subject-matter associated with the text of the electronic document;
   compare the subject-matter corresponding to the input with the subject-matter corresponding to the plurality of nodes;
   identify, based on the comparison, the node of the plurality of nodes related to the subject-matter corresponding to the input; and
   receive the plurality of words associated with the node of the plurality of nodes.

5. The system of claim 1, wherein the data processing arrangement is configured to identify the common words and receive the plurality of synonymous words corresponding to the identified common words in a:
sequential manner, or simultaneous manner.

6. The system of claim 1, wherein the server arrangement is configured to identify the semantic relationship of each keyword with other keywords of the generated set of keywords, based on at least one of: significance of the text of the electronic document and publicly-available information corresponding to each keyword of the generated set of keywords of the electronic document, wherein the significance of the text refers to importance of the information provided within the text of the electronic document, and wherein the significance of the text is provided as an input by the author of the electronic document.

7. The system of claim 1, wherein the server arrangement is configured to implement a machine-learning algorithm for determining the contextually-relevant keywords related to the text of electronic document.

8. A computer implemented method for determining contextually-relevant keywords related to text of an electronic document, wherein the computer implemented method comprises the following steps performed by a hardware processor:
storing the electronic document in an encrypted format;
extracting the text of the electronic document;
receiving a plurality of words from an ontology;
comparing each of the plurality of words with the text of the electronic document, to identify common words from the ontology that appear within the electronic document;
receiving a plurality of synonymous words corresponding to the common words;
generating a set of keywords comprising the common words and the plurality of synonymous words corresponding to the common words;
determining a preference score for each keyword of the set of keywords, the preference score being a score of relevance for each keyword of the set of keywords, wherein the preference score is based on one or more preference parameters, and wherein the one or more preference parameters comprise: frequency of occurrence of each keyword of the set of keywords within search strings previously used by a plurality of users of a search engine, frequency of occurrence of the common words within the text of the electronic document, location of occurrence of the common words within the text of the electronic document and publicly-available information corresponding to each keyword of the generated set of keywords of the electronic document;
identifying a semantic relationship of each keyword with other keywords of the set of keywords;
determining an importance score of each keyword of the set of keywords, the importance score being a score of significance of each keyword of the set of keywords, wherein the importance score is based on the semantic relationship between the keyword and other keywords of the generated set of keywords;
determining a cumulative rank for each keyword of the set of keywords, based on the preference score and the importance score of the keyword;
determining, based on the cumulative rank of each keyword of the set of keywords, the contextually-relevant keywords related to the text of electronic document, wherein the contextually-relevant keywords correspond to keywords of the set of keywords that arouse an interest in third-parties towards the text of the electronic document without revealing the text of the electronic document;
generating, based on the cumulative rank of each keyword of the set of keywords, a list comprising the contextually-relevant keywords arranged in at least one of: an increasing order, or a decreasing order of the cumulative ranks; and
generating the list of the contextually-relevant keywords for the user associated with the electronic document.

9. The computer implemented method of claim 8, wherein the ontology is a hierarchical ontology comprising a plurality of nodes, and wherein each of the plurality of nodes is associated with a plurality of words related to a subject-matter.

10. The computer implemented method of claim 9, wherein the method further comprises:
receiving an input from a user associated with the electronic document, wherein the input corresponds to a subject-matter associated with the text of the electronic document;
comparing the subject-matter corresponding to the input with the subject-matter corresponding to the plurality of nodes;
identifying, based on the comparison, the node of the plurality of nodes related to the subject-matter corresponding to the input; and
receiving the plurality of words associated with the node of the plurality of nodes.

11. The computer implemented method of claim 8, wherein the method comprises identifying the common words and receiving the plurality of synonymous words corresponding to the common words at in a:
sequential manner, or
simultaneous manner.

12. The computer implemented method of claim 8, wherein the method comprises identifying the semantic relationship of each keyword with other keywords of the generated set of keywords, based on at least one of: significance of the text of the electronic document and publicly-available information corresponding to each keyword of the generated set of keywords of the electronic document, wherein the significance of the text refers to importance of the information provided within the text of the electronic document, and wherein the significance of the text is provided as an input by the author of the electronic document.

13. A software product comprising non-transitory machine readable storage media storing instructions, wherein the instructions, when executed by computing hardware perform a method for determining contextually-relevant keywords related to text of an electronic document comprising:
storing the electronic document in an encrypted format;
extracting the text of the electronic document;
receiving a plurality of words from an ontology;
comparing each of the plurality of words with the text of the electronic document, to identify common words from the ontology that appear within the electronic document;
receiving a plurality of synonymous words corresponding to the common words;
generating a set of keywords comprising the common words and the plurality of synonymous words corresponding to the common words;
determining a preference score for each keyword of the set of keywords, the preference score being a score of relevance for each keyword of the set of keywords, wherein the preference score is based on one or more preference parameters, and wherein the one or more preference parameters comprise: frequency of occurrence of each keyword of the set of keywords within search strings previously used by a plurality of users of a search engine, frequency of occurrence of the common words within the text of the electronic document, location of occurrence of the common words within the text of the electronic document and publicly-available information corresponding to each keyword of the generated set of keywords of the electronic document;

identifying a semantic relationship of each keyword with other keywords of the set of keywords;

determining an importance score of each keyword of the set of keywords, the importance score being a score of significance of each keyword of the set of keywords, wherein the importance score is based on the semantic relationship between the keyword and other keywords of the generated set of keywords;

determining a cumulative rank for each keyword of the set of keywords, based on the preference score and the importance score of the keyword;

determining, based on the cumulative rank of each keyword of the set of keywords, the contextually-relevant keywords related to the text of electronic document, wherein the contextually-relevant keywords correspond to keywords of the set of keywords that arouse an interest in third-parties towards the text of the electronic document without revealing the text of the electronic document;

generating, based on the cumulative rank of each keyword of the set of keywords, a list comprising the contextually-relevant keywords arranged in at least one of: an increasing order, or a decreasing order of the cumulative ranks; and generating the list of the contextually-relevant keywords for the user associated with the electronic document.

* * * * *